United States Patent
Pearson

(10) Patent No.: US 7,148,469 B2
(45) Date of Patent: Dec. 12, 2006

(54) OPTICAL SIGNAL TRANSMISSION SYSTEM INCLUDING A SPLITTER AND A MIXER

(75) Inventor: Guy Neville Pearson, Malvern (GB)

(73) Assignee: QinetiQ Limited, Hants (GB)

( * ) Notice: Subject to any disclaimer, the term of this patent is extended or adjusted under 35 U.S.C. 154(b) by 210 days.

(21) Appl. No.: 10/501,009

(22) PCT Filed: Jan. 7, 2003

(86) PCT No.: PCT/GB03/00024

§ 371 (c)(1),
(2), (4) Date: Jul. 8, 2004

(87) PCT Pub. No.: WO03/061161

PCT Pub. Date: Jul. 24, 2003

(65) Prior Publication Data

US 2005/0041253 A1   Feb. 24, 2005

(30) Foreign Application Priority Data

Jan. 15, 2002   (GB) ................................. 0200770.6

(51) Int. Cl.
*G01J 1/04*   (2006.01)
(52) U.S. Cl. ................................. 250/227.12; 250/221
(58) Field of Classification Search ........... 250/227.12, 250/221, 203.6
See application file for complete search history.

(56) References Cited

U.S. PATENT DOCUMENTS

| | | | |
|---|---|---|---|
| 4,297,030 A | 10/1981 | Chaborski | |
| 4,830,486 A | 5/1989 | Goodwin | |
| 5,030,824 A | 7/1991 | Babbitt | |
| 5,170,218 A | 12/1992 | Keene | |
| 6,147,763 A | 11/2000 | Steinlechner | |
| 6,608,669 B1 * | 8/2003 | Holton | 356/28.5 |

FOREIGN PATENT DOCUMENTS

WO   WO 2/071097   9/2002

* cited by examiner

*Primary Examiner*—Que T. Le
(74) *Attorney, Agent, or Firm*—McDonnell Boehnen Hulbert & Berghoff LLP

(57) ABSTRACT

An optical transmission system includes an optical source such as a laser having an optical output, this optical output being modulated such that it has periods of operation having a first set of characteristics interspersed with periods of operation having a second set of characteristics. The output is then split into at least two signals, and one of the signals delayed with respect to the other signal before the two are mixed, such that a portion of the modulated optical output having the first set of characteristics in one of the signals corresponds with a portion of the modulated optical output having the second set of characteristics of another of the signals. This allows a single optical source to provide to a receiver a local oscillator signal simultaneously with a data carrying signal. The system is particularly suitable for lidar applications, including gas sensing, but also has utility in data communications systems.

26 Claims, 3 Drawing Sheets

OPTICAL SIGNAL TRANSMISSION SYSTEM INCLUDING A SPLITTER AND A MIXER

BACKGROUND OF THE INVENTION (1) Field of the Invention

This invention relates to an optical transmission system. The invention more particularly concerns a technique for generating local oscillator signals used in coherent communications systems, and other systems that both transmit and receive information at optical frequencies.

(2) Description of the Art

Conventional coherent optical communications systems, on reception of a received signal, downconvert the received signal to a frequency at which it is convenient to process it. This involves mixing the received signal with a local oscillator signal offset from the received signal by some convenient frequency. This will produce an output at the difference (downconverted) frequency, where typically lower cost components can be used for the subsequent processing. The advantage of this system over direct (incoherent) detection is that phase information is maintained in the downconverted signal, allowing synchronous detection methods to be used, and in addition can give the maximum level of performance in spectral regions where background noise or inefficient detector sensitivity lead to poor signal recovery.

One system where such optical processing is required is lidar. Here, an optical signal is transmitted to a target, and the reflections from the target are received and then processed to provide information relating to the target. Generally the transmitted signal is modulated in some way such that the returned signal contains additional information about the target, such as its range, velocity, vibration or reflectivity characteristics etc.

A common method of modulation used in lidar systems is to "chirp" the signal prior to transmission. A chirp is a frequency sweep of some form applied to the signal, where the sweep can be continuous or stepped discretely, or be a combination of both. A signal that contains a chirp can be processed in a manner that improves the range resolution of the system as compared to a non-chirped signal of equal pulse width. Traditionally, range resolution was improved in lidar systems by narrowing the transmitted pulse width. If the pulse is narrowed, then to maintain the same transmitted energy, and hence maintain the same range, the peak power of the pulse needs to be increased, which leads to costlier and larger systems. A chirped pulse of long duration can emulate the range resolution performance of a short pulse having the same energy, thus keeping the peak power low without sacrificing range performance. The bandwidth of the chirp is directly proportional to the improvement in range resolution of the system.

The technique is known as chirp pulse compression (CPC), as the returned signal is filtered in a manner that compresses the pulse. Before the filtering takes place the returned signal is downconverted to a lower frequency where signal processing is easier and cheaper. This is done by mixing the returned signal with a local oscillator (LO) that is offset in frequency from the returned signal by an appropriate amount.

Other modulation schemes include phase modulating the optical signal, or using some other form of modulation, such as amplitude modulation.

Generation of the local oscillator signal in such transmission systems has been implemented previously in two distinct ways. In one system a single laser has been used, the output of which is split into two. One part is then put through a modulator to add the modulation before being transmitted and reflected from a target, whilst the other is unmodulated and provides the LO signal. These two signals are then mixed together to produce the downconverted signal. This is described in more detail in Hulme, et al, Optical and Quantum Electronics, Vol 13, p35 (1981) An alternative approach is to use two lasers; one acts as the constant frequency local oscillator and the second is modulated and then transmitted as before. One example of this is the Firepond laser radar system, detailed in "Laser Radar" by A. Jellalian, Artech House, Boston (1992). The first technique has the disadvantage that the chirp bandwidth is limited to what can be achieved in an external (to the laser) modulator. External modulators are more limited in their modulation capabilities as compared to modulating a beam in the laser itself. The second method requires two separate lasers, and can suffer from instabilities due to frequency drift between them.

Optical signals are also used in communications systems, such as in telecommunications, and digital and analogue data transmission systems. These systems generally employ fibre optic transmission media, although some systems do transmit signals over free space. The detection of such signals is usually carried out in an incoherent manner, where no LO is required, which puts limitations on the minimum channel spacing.

SUMMARY OF THE INVENTION

According to the present invention there is provided a transmission system comprising a optical source having an optical output, this optical output being modulated such that it has periods of operation having a first set of characteristics interspersed with periods of operation having a second set of characteristics, wherein the modulated optical output is split into at least a first and a second signal, the first signal delayed by an amount of time relative to the second signal before being mixed with the second signal such that a portion of the modulated optical output having the first set of characteristics in the first signal corresponds with a portion of the modulated optical output having the second set of characteristics of the second signal.

Preferably the optical source is a laser.

The present invention allows a single laser to be used to produce both the LO signal and the modulated signal for transmitting. This provides advantages over the prior art in that the modulation may be produced within the laser, which allows for large bandwidth signals to be generated without having to provide and stabilise a second laser. Some applications advantageously employ an additional modulation stage in the form of an external modulator to further modulate the optical output. The external modulator may be positioned before the optical signal is split into a first and a second signal, or may be positioned such that it operates exclusively on either the first or the second signal. The external modulator may be an acousto-optic modulator, electro-optic modulator, or photoelastic modulator. Other modulator types may be suitable.

Preferably the delay is realised using a length of fibre optic cable. The signal to be delayed is launched down a fibre, and will emerge from the other end with a delay proportional to the length of the fibre. Preferably the fibre is a single mode fibre. The fibre may be a polarisation preserving fibre.

It should be noted that as used herein the term delay is used in the sense of ensuring that the transit duration of one signal compared with the other is appropriate to ensure that the first set of characteristics on one signal are mixed with the second set of characteristics on the other. It should not be taken as implying that one signal must have a greater duration of transit. For instance in a lidar application one signal may be transmitted to and received reflected from a target before being passed to a combiner where it is mixed with the other, reference, signal. The delay line may advantageously be employed on the reference signal to ensure that the two signals mix appropriately but the actual transit time of the transmitted signal may be greater or lesser according to the particular arrangement.

Advantageously the delay time of the delay line may be changed according to system requirements. This may be done by switching extra delays in or out of the total delay line as appropriate, or by any other suitable means.

For telecommunications applications the invention allows the system that generates the modulated signal to also supply the local oscillator that is to be used in the system that demodulates the received signal. The first signal may be delayed with respect to the second, and then combined with it to form a composite signal. In this way, the invention provides the ability to send the part of the first signal having the first set of characteristics at the same time as the part of the second signal having the second set of characteristics. In this way, a signal is transmitted simultaneously with its LO, allowing for simple demodulation.

Such a system sends two copies of each of the first and second sets of characteristics, one following the other. Thus any data modulated onto these signals is actually sent twice, allowing improved error detecting or correcting means to be employed at the receiver.

Alternatively, a signal from the laser comprising a first and a second set of characteristics may be transmitted to a remote location, where the received signal is then split into two, and one of the split signals delayed with respect to the other such that the first set of characteristics from the first signal combine with the second set of characteristics from the second signal. This will then provide simultaneously to a demodulator a modulated signal and its LO signal, again allowing for simple demodulation.

For many applications the first set of characteristics of the optical output will be that the optical output is kept at a constant frequency and constant amplitude. This can then be used as a constant frequency LO signal as is commonly employed in communications and lidar systems. Some applications may advantageously employ a first set of characteristics incorporating a signal that changes its frequency or amplitude, or combinations thereof, or other characteristics. This may be desirable to remove some known artefact of the signal added by the transmission system.

The second set of characteristics will typically comprise the modulation desired on the output signal. For example, the signal may be chirped, amplitude modulated, angle modulated, or modulated in any other suitable manner during this period.

It should be noted that either or both of the first and second sets of characteristics can be changed over time. For example, a data transmission system that codes the data into the second characteristic period will in general transmit different data in each second characteristic period.

The laser may be any type of laser suitable for the application. When used in a lidar application the laser is preferably capable of being controlled so as to modify its optical output in terms of amplitude or wavelength according to that required by the system characteristics. Typically the controlling signal will be generated using a computer system, but other methods, e.g. a hardware waveform generator, may be employed. Telecommunications systems may advantageously employ one or more external modulators in which the amplitude or wavelength of the optical signal from the laser may be changed. The laser may be a semiconductor laser. The semiconductor laser may be modulated by controlling the drive current to the laser.

The time delay of the delay line is arranged to be appropriate for the system. In a lidar application the delay is preferably arranged to be at least that of the round-trip flight time of an electromagnetic signal launched from the lidar system that reflects from a target at the system maximum range. Preferably the delay of the delay line is increased to allow for the time taken for the signal to pass through the system transmission and reception optics.

A telecommunications application would preferably have the optical output spending equal periods of time between the first and the second set of characteristics, so providing maximum temporal efficiency, as substantially all of the signal having the first characteristic can be mixed with substantially all of the signal having the second characteristics. In this circumstance the delay time would be set to the substantially the same time period as either the first or second set of characteristics.

The duration of both the first and second set of characteristics is arranged to be appropriate for the system. In a lidar application the duration of each will be governed by, amongst other factors, the lidar system's minimum and maximum ranges. The chosen time delay provided by the delay line to the first signal relative to the second signal may also be affected by system parameters including minimum and maximum range requirements.

A telecommunications application will have a delay preferably equal to the time duration of a packet of data. In the context of the current invention, a packet of data is the data present on a single period of the output waveform during either the first or second set of characteristics.

Mixing, of the first and second signals may be performed by any standard means. Demodulation and recovery of the modulating signal may be performed by any standard means, and such methods will be familiar to those skilled in the art. The first and second signals may be combined before being mixed. Preferably the combination process matches the polarisation of the first and second signals. The polarisation may be matched using a mechanical polarisation control device, or by an electro-optic polarisation control device, or by any other suitable means.

According to another aspect of the invention there is provided a lidar system comprising an optical source having an optical output, this optical output being modulated such that it has periods of operation having a first set of characteristics interspersed with periods of operation having a second set of characteristics, wherein the optical output is split into at least a first and a second signal, the second signal being transmitted and received as a returned second signal, and the first signal delayed by an amount of time relative to the returned second signal before being mixed with the returned second signal such that a portion of the optical output having the first set of characteristics in the first signal mixes with a portion of the optical output having the second set of characteristics of the returned second signal.

According to another aspect of the invention there is provided a telecommunications system comprising an optical source having an optical output, this optical output being modulated with a modulating signal such that it has periods of operation having a first set of characteristics interspersed with periods of operation having a second set of characteristics, wherein the modulated optical output is transmitted to a remote location where it is received and demodulated using a demodulator to reproduce the modulating signal;

and at a point between generation of the optical output and demodulation the modulated optical output is split into at least a first and a second signal, the first signal delayed by an amount of time relative to the second signal such that a portion of the optical output having the first set of characteristics in the first signal corresponds with a portion of the optical output having the second set of characteristics of the second signal to aid the reproduction of the modulating signal.

The splitting of the optical output into a first and a second signal, and the delaying of one of the signals relative to the other may take place within the transmitter or within the receiver. If it occurs in the transmitter then preferably the signals are combined before being transmitted to a remote location.

According to another aspect of the invention there is provided a gas sensor comprising a transmit part and a receive part, wherein the transmit part comprises an optical source having an optical output, this optical output being modulated such that it has periods of operation having a first set of characteristics interspersed with periods of operation having a second set of characteristics, this optical output being split into at least a first and a second signal, the second signal being delayed and combined with the first signal to produce a transmit signal such that the second set of characteristics is substantially coincident in time with the first set of characteristics, and the receive part comprises a detector capable of distinguishing the first and second sets of characteristics on receipt of the transmit signal.

Preferably the first and second sets of characteristics are of equal time duration. Preferably the first set of characteristics comprise a constant frequency. Preferably the second set of characteristics comprise a constant frequency, different to that of the first set of characteristics.

According to a further aspect of the invention there is provided a method of transmitting an optical signal, comprising:

providing an optical source having an optical output;

modulating the optical output with a modulating signal such that it has periods of operation having a first set of characteristics interspersed with periods of operation having a second set of characteristics;

passing the modulated optical output to a receive part;

demodulating the received modulated optical output in the receive part to substantially reproduce the modulating signal;

and at a point between generation of the optical output and demodulation the modulated optical output is split into at least a first and a second signal, the first signal delayed by an amount of time relative to the second signal such that a portion of the optical output having the first set of characteristics in the first signal corresponds with a portion of the optical output having the second set of characteristics of the second signal to aid the reproduction of the modulating signal.

The splitting of the modulated optical output may take place either before or after the modulated optical output is passed to the receive part.

DESCRIPTION OF THE FIGURES

Embodiments of the current invention will now be described, by way of example only, with reference to the accompanying illustrative drawings, in which.

DESCRIPTION OF A PREFERRED EMBODIMENT

Figure 1:
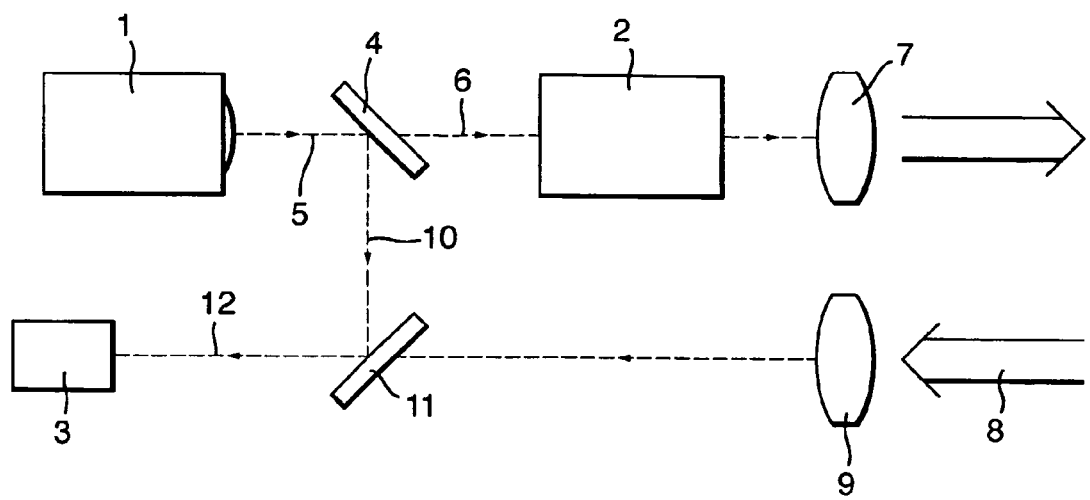
FIG. 1 diagrammatically illustrates a block diagram of one implementation of a lidar system of the prior art.

FIG. 1 shows part of a lidar system of the prior art that incorporates a single laser 1 whose optical output 5 is split into a first and a second optical signal using a semi-silvered mirror 4. The first optical signal 6 is then passed through a modulator 2, transmitted via an optical system such as a lens 7 to a target (not shown), and the reflected signal 8 from the target is received via an optical system such as a lens 9 and then combined with the second optical signal 10 of the optical output 5 using a second semi-silvered mirror 11. The combined signal 12 is then detected using standard detecting means 3. In this way, the laser supplies both the local oscillator signal 10 and (via the external modulator 2) the coded signal for transmit. Typically, the coded signal comprises a linear ramp in frequency with time. The disadvantage of this system topology is that current external modulator capabilities provide a limitation on what modulation may be applied. The usual method of imparting a frequency shift with an external modulator is to use an acousto-optic modulator. Modulators based upon this technology are limited in bandwidth due to the fact that the different frequencies are diffracted at different angles. This angular shift means that the bandwidth has to be kept low in order to maintain a sufficiently small angular spread in the modulated beam. This limits the bandwidth, and consequently the resolution, which can be obtained.

Figure 2:
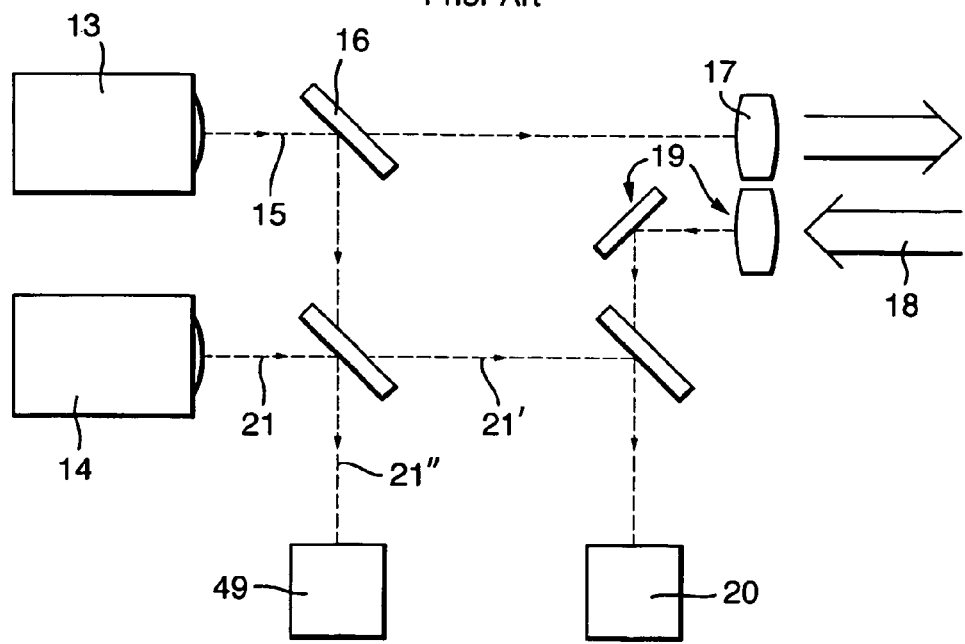
FIG. 2 diagrammatically illustrates a block diagram of another implementation of a lidar system of the prior art.

FIG. 2 shows an alternative embodiment of a lidar system of the prior art. Here, two lasers 13, 14 are used to provide the modulated transmit signal and the local oscillator signal respectively. Again, the modulated signal is typically a frequency ramp signal. The modulated output 15 of the first laser 13 is split into a first and second optical signal using a semi-silvered mirror 16, with the first optical signal being transmitted to the target via optics 17, and the second optical signal going to a reference detector 49. The signal 18 received back from the target is transmitted via optics 19 to the signal detector 20, along with the local oscillator signal 21' from laser 14. A part 21" of signal 21 is split off and sent to the reference detector. The output of the reference detector is used to control the offset frequency between lasers 13 and 14. This embodiment suffers from the problem that, although the laser can be modulated easily, maintaining a known frequency difference between the two, so as to get a predictable signal from the detector is difficult, and requires extra hardware, as the two separate lasers are prone to drift in frequency relative to each other.

Figure 3:
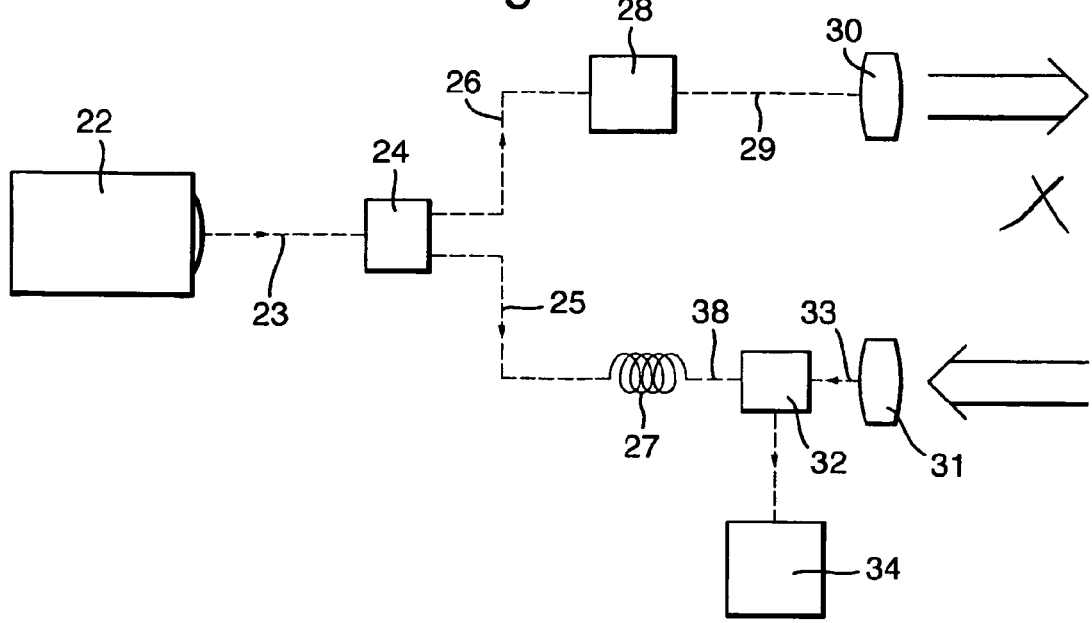
FIG. 3 diagrammatically illustrates a block diagram of one embodiment of the transmission system according to the current invention.

An embodiment of the current invention applied to a lidar system is given in FIG. 3. A laser 22 provides an optical output 23 to a two way splitter 24. The optical output 23 is arranged to remain at a constant frequency for a first time period, after which it is modulated in the form of a frequency ramp for a second time period, repeating this behaviour in successive cycles. One output 25 of the splitter 24 is fed into a delay line 27 which comprises a length of single mode optical fibre. The other output 26 of the splitter 24 is directed towards an optical shutter 28, in this case a pulsed acousto-optic modulator (AOM) that is able to selectively gate or window in time, a portion of the optical signal entering it. Ideally, it acts as an amplitude modulator having a modulation index of 100%. The shutter 28 is controlled by circuitry not shown on the diagram such that it passes a chirped portion 29 of the laser radiation 26 through to the front end 30 of the lidar system, where it is transmitted to a target. The signal can be further modulated before transmission if desired. For example, data can be added to the signal, or the signal can be further modulated to provide additional information content to the received signal.

The returned signal 33 reflected back from the target is passed through a receive optical system 31 to a combiner 32. The second input to the combiner is the output 38 of the delay line 27. The time delay of the delay line is arranged to be such that when the signal 38 is combined with the signal 33, there exists a time shift between the two signals 38, 33, ensuring that the first set of characteristics on the one signal is coincident in time with the second set of characteristics on the other signal. Therefore, the returned chirped signal from the target gets combined with the constant frequency signal. The combined signal is passed to the detector 34, where signal detection takes place. The presence of a constant, known frequency acting as the LO signal improves the signal analysis process later in the processing chain.

The laser 22 used is an external cavity semiconductor laser, and frequency control is effected by controlling the drive current to the device. A linear ramp in the current produces an approximately linear ramp in frequency. The drive current waveform can of course be adjusted to provide any desired frequency profile given knowledge of the laser characteristics. Hence, any non-linearities can be corrected.

Figure 4A:
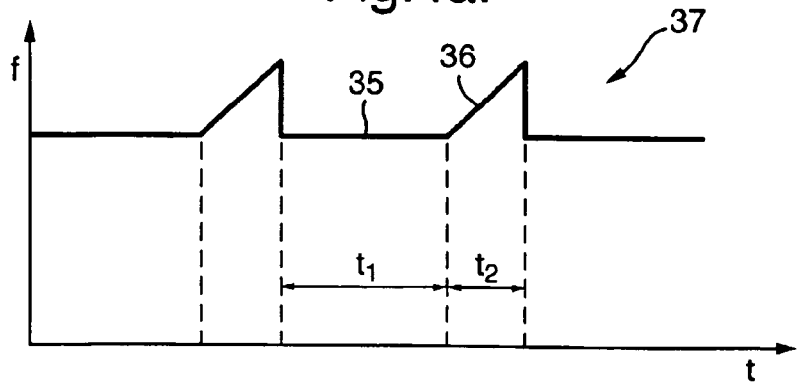
FIG. 4 diagrammatically illustrates a laser output waveform applicable to the current invention used in the embodiment of FIG. 2
Figure 4B:
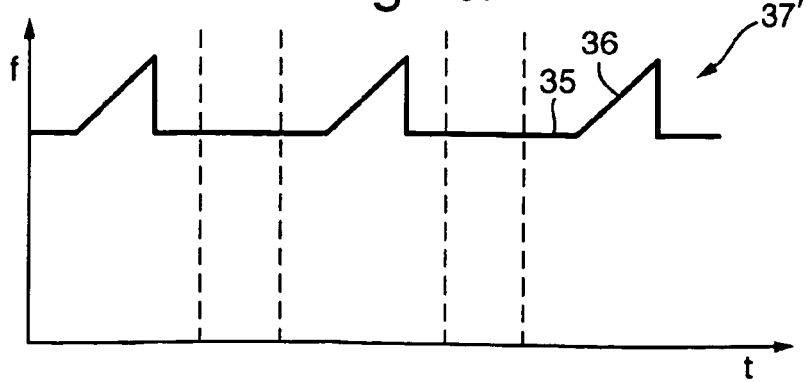

FIG. 4 shows a typical output waveform 37 that can be used with the current invention. FIG. 4a shows the waveform 37 having a first characteristic 35, this characteristic being a constant frequency, and is the local oscillator (LO) frequency to be used in the demodulation process. The waveform has a second characteristic 36 following after a period $t_1$ of the first characteristic 35, the second characteristic being a frequency chirp of period $t_2$. FIG. 4b shows a waveform 37', this being the waveform 37 of FIG. 4a having been delayed by a delay of somewhere between $t_1$ and $t_2$, this delay being accomplished by passing the waveform 37 down the delay line 27. It can be seen that the chirp 36 of the waveform 37' occurs entirely within the time period t1 of the waveform 37. The delay of the delay line can be anything from zero up to what is achievable with a practical delay line implementation. In a lidar application a delay is added to one of the signals relative to the other by the flight time of the signal to the target and back to the receiving system. The relative time shift given to the signals when they are combined in the receive system needs to be considered, so the delay times of the delay line and the delay caused by signal flight time to a target must both be accounted for. Note also that when deciding upon the duration of time periods $t_1$ and $t_2$ consideration should be given to the round trip flight time of the optical signal between the system minimum range and the system maximum range.

As there is an approximate linear relationship between the drive current to the laser and the frequency output within certain bounds, the vertical axes of the graphs of FIGS. 4a and 4b could also be regarded as representing drive current. The output frequency is thus chirped by ramping the drive current of the laser.

Applying these signals to the system of FIG. 3, the times t1 and t2, and the delay time td of the delay line are ideally chosen such that the signal 33 returned from the target is delayed relative to the signal 38 at the output of the delay line so as to keep the characteristic 36 of FIG. 4b enclosed timewise within the characteristic 35 of FIG. 4a for all ranges required of the system. Note that other system constraints will also impose limitations on these variables. Ensuring a suitable phase relationship between the two signals at the point of them being combined may also be achieved by incorporating the delay line in the optical path of the signal to be transmitted, rather than in the path of the signal providing the reference. Such a system would result in the delay line 27 of FIG. 3 appearing in the upper optical path rather than the lower optical path as shown in the Figure.

Figure 5:
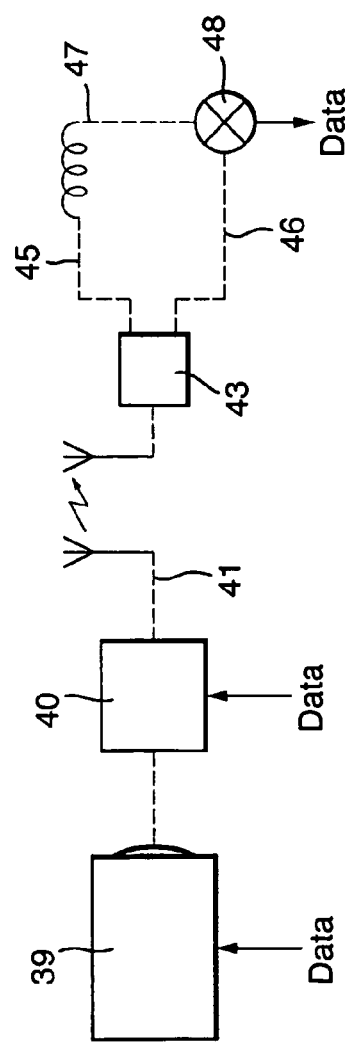
FIG. 5 diagrammatically illustrates a second embodiment of a system according to the current invention, this being a telecommunications system.

FIG. 5 shows the current invention incorporated into a telecommunications system. An optical signal 41 is produced that has a first and a second characteristic, where the second characteristic comprises the optical signal modulated according to a data stream. The modulation can occur either in the laser 39 producing the optical signal, or externally using a separate optical modulator 40. The first characteristic is chosen such that it can act as a convenient Local Oscillator (LO) signal when it is required to demodulate the second characteristic of the signal 41. The signal 41 is then transmitted to some remote point, where it is first split into two receive signals, 45 46 using a splitter 43. One of the signals 45 is passed through a delay line 44, to produce a delayed version 47. The delay time is chosen such that the second characteristic of signal 47 is made to coincide in time with the first characteristic of signal 46. The signals 46 and 47 are then fed into a demodulator 48, where a copy of the original data stream is extracted.

Figure 6:
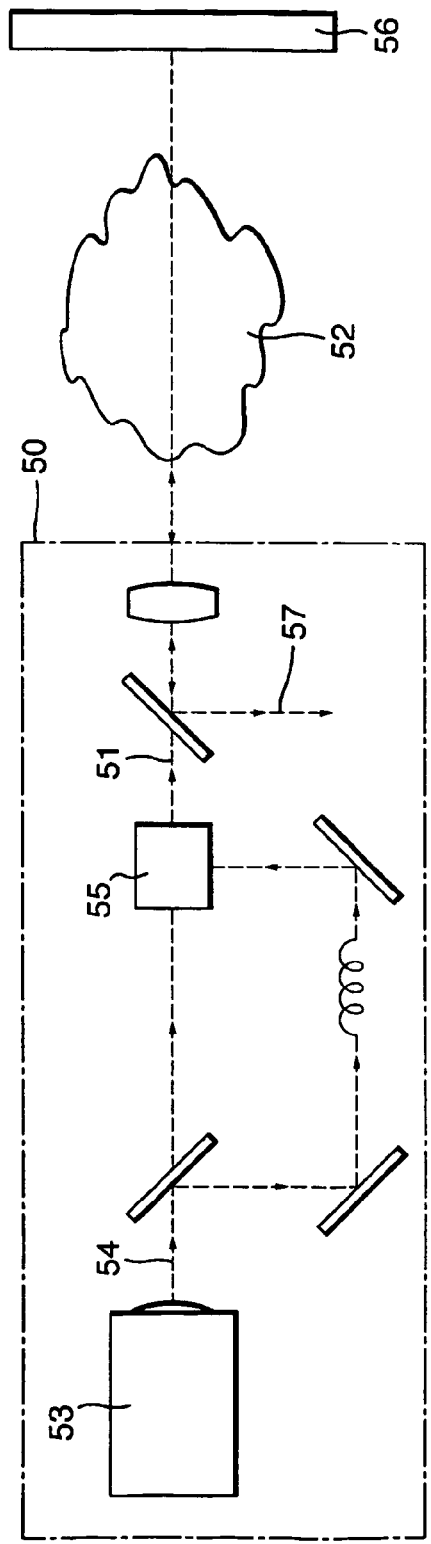
FIG. 6 diagrammatically illustrates a third embodiment of a system according to the current invention, this being a gas sensing system.

FIG. 6 shows a further embodiment of the current invention employed as a gas sensor. Here, the gas sensor comprises a lidar system 50 which is arranged to transmit a signal 51 through a target gas cloud 52 and receive any reflected signals. The signal is arranged to comprise at least two different wavelengths, these being chosen such that one of them is known to be coincident with an absorption feature of the target gas species, and the other to remain relatively unaffected by the gas species. The relative attenuation of the two frequencies at the receiver then gives a measure of the concentration of the target species in the optical path.

Methods of the prior art either employ two lasers to generate the two different wavelengths, or send a signal at a first wavelength followed by a signal a second wavelength. The latter has the disadvantage that between sending the first and second signals the characteristics of the gas cloud may change.

The transmit section of the gas sensor lidar of the current invention comprises a laser 53 that produces a signal 54 alternating in time between two different wavelengths. This signal is split between two paths, one of the paths incorporating a delay line, and then recombined. The delay period is arranged such that when the signals are combined in combiner 55 the signal comprises the two wavelengths simultaneously. This signal is then transmitted to the target gas cloud 52 and reflected back from a reflector 56. The reflected signal 57 is then passed to a receiver (not shown)

where the relative amplitudes of the two wavelengths are compared. FIG. 6 shows the system operating in topographic mode, where a solid target 56 is used as a reflector and the intervening optical path analysed. Distributed backscatter from particles making up the gas cloud may also be used to obtain a return signal 57.

Other embodiments and applications of the present invention will be apparent to the skilled person.

The invention claimed is:

1. A transmission system comprising an optical source having an optical output, this optical output being modulated such that it has periods of operation having a first set of characteristics interspersed with periods of operation having a second set of characteristics, wherein the modulated optical output is split into at least a first and a second signal, the first signal delayed by an amount of time relative to the second signal before being mixed with the second signal such that a portion of the modulated optical output having the first set of characteristics in the first signal corresponds with a portion of the modulated optical output having the second set of characteristics of the second signal.

2. A transmission system as claimed in claim 1 where the first characteristic of the optical output is a constant frequency.

3. A transmission system as claimed in claims 1 wherein the delay mechanism comprises a length of optical fibre.

4. A transmission system as claimed in claim 3 wherein the optical fibre is single mode.

5. A transmission system as claimed in claim 1 wherein a portion of the second signal is gated for transmission, and substantially all of the gated portion of the second signal is mixed with a portion of the first signal.

6. A transmission system as claimed in claim 1 wherein the laser is driven with a control signal in order to control the optical output frequency.

7. A transmission system as claimed in claim 6 where the laser is a semiconductor laser.

8. A transmission system as claimed in claim 1 wherein the optical output is modulated by a modulation means external to the laser.

9. A transmission system as claimed in claim 8 where the modulation means is an acousto-optic modulator.

10. A transmission system as claimed in claim 8 where the modulation means is an electro-optic modulator.

11. A transmission system as claimed in claim 8 where the modulation means is a photoelastic modulator.

12. A transmission system as claimed in claim 1 wherein the signals are combined before being mixed.

13. A transmission system as claimed in claim 1 where the polarisation of the first signal is matched to that of the second signal before being mixed.

14. A transmission system as claimed in claim 13 where the delay line incorporates a polarising preserving fibre.

15. A transmission system as claimed in claim 13 where the polarisation is matched using a mechanical polarisation control device.

16. A transmission system as claimed in claim 13 where the polarisation is matched using an electro-optic polarisation control device.

17. A transmission system as claimed in claim 1 where the system is a lidar system.

18. A lidar system comprising an optical source having an optical output, this optical output being modulated such that it has periods of operation having a first set of characteristics interspersed with periods of operation having a second set of characteristics, wherein the optical output is split into at least a first and a second signal, the second signal being transmitted and received as a returned second signal, and the first signal delayed by an amount of time relative to the returned second signal before being mixed with the returned second signal such that a portion of the optical output having the first set of characteristics in the first signal corresponds wit a portion of the optical output having the second set of characteristics of the returned second signal.

19. A gas sensor comprising a transmit pan and a receive part, wherein die transmit part comprises an optical source having an optical output, this optical output being modulated such that it has periods of operation having a first set of characteristics interspersed wit periods of operation having a second set of characteristics, this optical output being split into at least a first and a second signal, the second signal being delayed and combined with the first signal to produce a transmit signal such that the second set of characteristics is substantially coincident in time with the first set of characteristics, and the receive part comprises a detector capable of distinguishing the first and second sets of characteristics on receipt of the transmit signal.

20. A gas sensor as claimed in claim 19 wherein each set of characteristics comprise a constant frequency, where the frequency of the first is different to the frequency of the second.

21. A telecommunications system comprising an optical source having an optical output, this optical output being modulated with a modulating signal such that it has periods of operation having a first set of characteristics interspersed with periods of operation having a second set of characteristics, wherein the modulated optical output is transmitted to a remote location where it is received and demodulated using a demodulator to reproduce the modulating signal;

and at a point between generation of the optical output and demodulation the modulated optical output is split into at least a first and a second signal, the first signal delayed by an amount of time relative to the second signal such that a portion of the optical output having the first set of characteristics in the first signal corresponds with a portion of the optical output having the second set of characteristics of the second signal to aid the reproduction of the modulating signal.

22. A telecommunications system as claimed in claim 21 wherein the modulated optical output is split into at least a first and a second signal before the signals are transmitted to the remote location.

23. A telecommunications system as claimed in claim 21 wherein the modulated optical output is split into at least a first and a second signal after the signals are transmitted to the remote location.

24. A method of transmitting an optical signal, comprising:

providing an optical source having an optical output;

modulating the optical output with a modulating signal such that it has periods of operation having a first set of characteristics interspersed with periods of operation having a second set of characteristics;

passing the modulated optical output to a receive part;

demodulating the received modulated optical output in the receive part to substantially reproduce the modulating signal;

and at a point between generation of the optical output and demodulation the modulated optical output is split into at least a first and a second signal, the first signal delayed by an amount of time relative to the second signal such that a portion of the optical output having the first set of characteristics in the first signal corresponds with a portion of the optical output having the second set of characteristics of the second signal to aid the reproduction of the modulating signal.

25. A method as claimed in claim 24 wherein the splitting takes place before the modulated optical output is passed to the receive part.

26. A method as claimed in claim 24 wherein the splitting takes place after the modulated optical output is passed to the receive part.

* * * * *